March 4, 1924.  
C. E. BREDON  
1,485,956  
APPARATUS FOR TAKING AND EXAMINING COLOR PHOTOGRAPHS  
Filed July 30, 1920  
5 Sheets-Sheet 2

Charles Emile Bredon  
Inventor;  
per H. W. Pencher  
Attorney

March 4, 1924.

C. E. BREDON 1,485,956

APPARATUS FOR TAKING AND EXAMINING COLOR PHOTOGRAPHS

Filed July 30, 1920    5 Sheets-Sheet 3

CHARLES EMILE BREDON
Inventor;
per H. W. Penaker.
Attorney.

March 4, 1924.  1,485,956

C. E. BREDON

APPARATUS FOR TAKING AND EXAMINING COLOR PHOTOGRAPHS

Filed July 30, 1920  5 Sheets-Sheet 4

Charles Emile Bredon
Inventor:

per H. W. Penester
Attorney.

March 4, 1924.

C. E. BREDON

1,485,956

APPARATUS FOR TAKING AND EXAMINING COLOR PHOTOGRAPHS

Filed July 30, 1920   5 Sheets-Sheet 5

CHARLES EMILE BREDON
*Inventor,*
per H. W. Penmar
*Attorney*

Patented Mar. 4, 1924.

1,485,956

UNITED STATES PATENT OFFICE.

CHARLES EMILE BREDON, OF PARIS, FRANCE.

APPARATUS FOR TAKING AND EXAMINING COLOR PHOTOGRAPHS.

Application filed July 30, 1920. Serial No. 400,169.

(GRANTED UNDER THE PROVISIONS OF THE ACT OF MARCH 3, 1921, 41 STAT. L., 1313.)

*To all whom it may concern:*

Be it known that I, CHARLES EMILE BREDON, of Paris, France, a citizen of the French Republic, have invented an Apparatus for Taking and Examining Color Photographs (for which I have applied for patents in France on July 11, 1919, and June 29, 1920), of which the following is a full, clear, and exact description.

Numerous devices for trichrome photography have been proposed since Ducos du Hauron, Ch. Cros, in France, Yves, Joly, etc. in other countries. These devices may be divided in two classes: 1°—those which give three images by means of a single objective; 2°—those which present three independent optical systems.

The first of these devices generally necessitate the use of three distinct plates, which are not arranged in the same plane; the application of this principle can only give results provided use is made of very delicate micrometric methods for the registration of the monochromatic plates; this principle, which is difficult to apply to monocular views, becomes quite impossible in stereoscopy.

The devices provided with three independent optical systems allow the three images of each view to be brought back in a single plane and eventually on one and the same plate; in this manner they reduce to a minimum the difficulties of registration, but then occurs a phenomenon of parallax between the three points of distance of the optical systems, phenomenon which allows the superposition of the monochromatic plates only according to a single plane and for a very small angle. Consequently, these devices are not applicable to stereoscopy where the difference of the planes and the angle embraced play a primordial part.

This invention has for its object a device for taking and examining color photographs combining the advantages of both the above mentioned classes of devices without the inconveniences of the same.

This apparatus, which comprises three independent optical systems, is essentially characterized by the fact that it is provided with a single opening or pupil common to these three optical systems and that the positions of the three devices relatively to each other and relatively to the common pupil, are determined in such a manner that the three images formed on the sensitized plate respectively filtered by a blue screen, a green screen and a red screen, come from one and the same point of distance and that these three objectives each give the same image of the subject, whatever may be the part of the pupil they utilize.

The luminous rays entering through this opening or pupil are divided in three bundles by two total double reflection prisms fitted against the inner face of a diaphragm; these two prisms are arranged on opposite sides of the axis of the pupil opening so as to leave a space between them and to each cover a portion of this opening. The three bundles thus formed comprise a middle bundle passing directly between the two prisms and two deviated bundles sent back by their double reflection in the prisms at a certain distance from the middle bundle and parallel to the latter. These three bundles pass respectively through three blue, green, and red selecting screens before encountering the panchromatic plate to be printed.

By its combination, the present chromographic apparatus gives in a single exposure, on any single panchromatic plate, by the processes of ordinary photography, three superposable images, of easy registration and thus permits the realization of color stereoscopy.

For color stereoscopy, the apparatus comprises two simple devices each constituted as above set forth and arranged in such a manner as to simultaneously obtain, on a single panchromatic plate, six similar images of the same subject (three for each eye).

The apparatus forming the subject-matter of this invention can be used for taking views and for examining these views, with the exact reproduction of the colors of the photographed subjects.

The simple or stereoscopic proofs obtained with the present type of simple or stereoscopic chromographic apparatus are developed, fixed and printed on ordinary diapositive plates by means of the methods generally used in photography.

In the chromographic apparatus used for taking the views, these positives can be examined by means of an eye-piece of special construction fitted at the front part of this apparatus and comprising substantially four lenses divided in two groups between which is arranged a prism. By its special constitution, this eye-piece permits of seeing simultaneously the various positive images previously placed in the chromograph, behind their respective selecting screens and produces the optical melting of these various images into a single one reproducing accurately the colors of the model; the said image is seen in its real position, without necessitating in the case, of stereoscopic positives, any previous transposition at the time of printing these positives.

In order that this invention may be clearly understood it will be described hereafter with reference to the accompanying drawing, in which:

Figs. 2 to 8 illustrate a stereoscopic apparatus made in accordance with this invention.

Figs. 14 and 15 illustrate an arrangement of a holder for carrying the positive.

Figure 1:
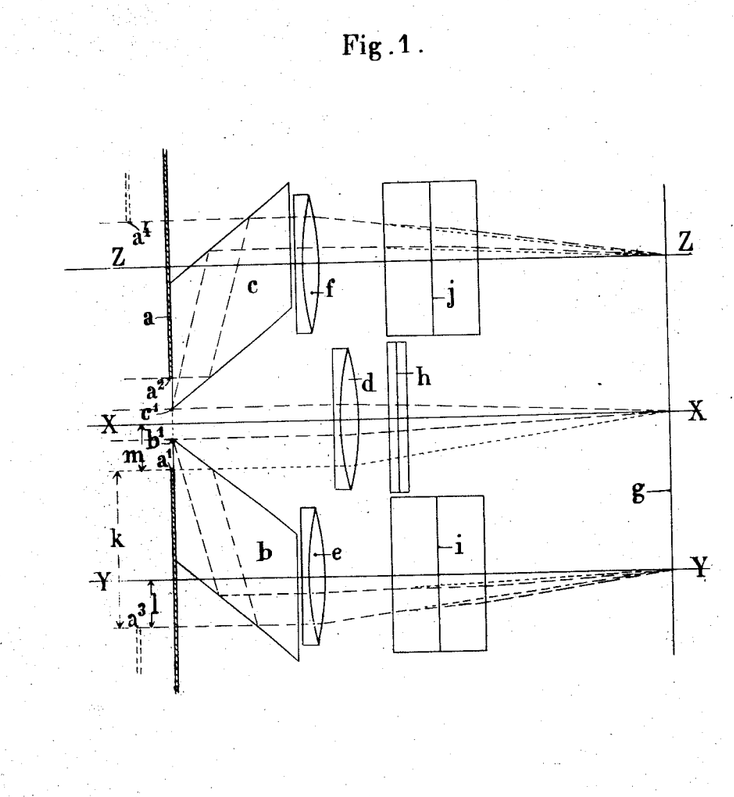
Fig. 1 is a diagrammatic view showing the principle of the invention.
Figure 2:
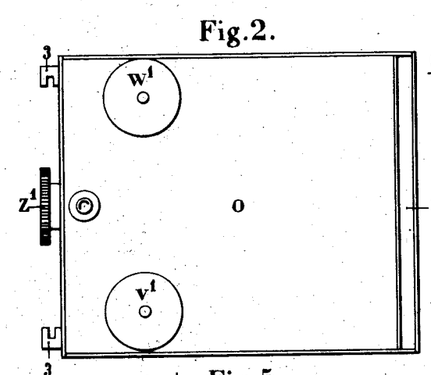
Fig. 2 is a side elevation.

The device forming the subject-matter of the invention comprises essentially a diaphragm $a$ provided with an opening $a^1 a^2$ through which enter the bundle of luminous rays which is to pass through the three objectives; this opening which is of circular shape, has a diameter equal to the utilizable opening of the objectives employed; against the rear face of this diaphragm $a$ are fitted two total double reflection prisms arranged on each side of the axis passing through the center of the opening of the diaphragm $a$ and located in such a manner that one of the edges of each of these prisms overlaps a portion of this opening; these two prisms are adapted to deflect on each side of the central axis X—X a portion of the bundle of luminous rays entering through the said opening.

The luminous rays, at their entrance in the apparatus, are thus divided in three bundles: a middle bundle passing directly between the two prisms $b\ c$ and two deflected bundles sent back, by double reflection, in these prisms, at a certain distance from the middle bundle and parallel to the latter.

Three objectives $d\ e\ f$ are respectively mounted opposite the opening of the diaphragm $a$ and to the two prisms $b\ c$; the objective $d$, the optical axis of which coincides with the central axis X—X, receives directly the middle bundle comprised between the edges $b^1$, $c^1$ of the two prisms; the side objectives $e$, $f$ arranged respectively behind the two prisms $b$, $c$ are traversed by the two deviated bundles entering in the apparatus through the surfaces of the two prisms uncovered by the opening.

The three images formed by the objectives $d$, $e$, $f$ are printed on a sensitized plate $g$.

Between the objectives and this sensitized plate are interposed three selecting screens (blue, green, red) $h$, $i$, $j$ each glued between two glass plates.

In order that the three images formed by the objectives $d\ e\ f$ may be superposed and in the same plane, the positions of the three objectives relatively to each other and relatively to the diaphragm, as well as the thickness of the glass plates between which are glued the selecting screens, are determined in the following manner:

1°—As the virtual images of the edges of the opening of the diaphragm $a$, formed by the prisms $b$, $c$ are outside the plane of this diaphragm and in front of the latter, according to a distance depending from the length of travel of the luminous rays within the prisms and of the index of refraction of the material constituting the latter, the distance separating the side objectives $e\ f$ from the diaphragm $a$ is determined in such a manner that the distance from these objectives to the virtual images $a^3$, $a^4$ of the points $a^1$, $a^2$ of the edge of the opening of this diaphragm, formed by the prisms, is equal to the distance separating the central objective $d$ from the diaphragm $a$.

2°—The optical axes of the side objectives $e$, $f$ are symmetric relatively to the optical axis X—X of the middle objective $d$ and at a distance from this axis equal to the deviation $k$ to which are subjected the rays when passing through the prisms after their double reflection.

3°—The glass plates of the selecting screens $i$, $j$ have a thickness greater than that of the glass plates of the middle selecting screen $h$ for the purpose of lengthening by refraction the luminous cones passing through the same, this thickness is calculated in such a manner that this lengthening compensates for the differences of distance from the objectives to the sensitized plate and that the three focal planes are brought in coincidence with the plane of the said plate.

In the device which has just been described, if we consider the point $a^1$ of the edge of the opening of the diaphragm $a$ and the point $a^3$, virtual image of this point $a^1$, formed by the prism $b$, it is seen that the distance $l$ from this point $a^3$ to the optical axis Y—Y of the side objective $e$ is equal to the distance $m$ from the point $a^1$ to the optical axis X—X of the central objective $d$, since, as above stated, the spacing apart of the optical axes X—X and Y—Y of the objectives $d$ and $e$ is equal to the deflection $k$ to which has been subjected the ray passing through the point $a$ after its double reflection in the prism $b$. In these conditions, the point $a^3$, virtual image of the point $a^1$, must be considered as located on the edge of the utilizable opening of the objective $e$, in other words the point $a^3$ occupies relatively to the side objective $e$ the same relative position as the point $a^1$ relatively to the central objective $d$.

In the same way, if we consider the point $a^2$ of the edge of the opening of the diaphragm $a$, diametrically opposed to the point $a^1$, the virtual image $a^4$ of this point $a^2$, formed by the prism $c$, coincides with the corresponding edge of the utilizable opening of the other side objective $f$.

By means of the device which has just been described, the three objectives have therefore the same utilizable opening: the common opening $a^1$ $a^2$ of the diaphragm $a$. In these conditions, these three objectives each give the same image of the subject, whatever may be the portion of the opening $a^1$ $a^2$ they utilize, in other words the three images formed by these three objectives correspond to three views of the subject taken from a single point; consequently, these three images are rigorously superposable.

The three images having been impressed on the sensitized plate $g$, if the above described device is used afterwards for examining these images in such conditions that the rays, coming from the said images and passing totally or in part through the common opening $a^1$ $a^2$ of the diaphragm $a$, simultaneously reach the eye of the observer, the latter will have the impression of seeing a single image.

For the purpose of increasing the luminous efficiency of the apparatus, when taking views, it is advantageous to give to the opening of the diaphragm a slightly larger surface than that corresponding to the utilizable opening of the objectives.

In this case, the distance $k$ from the optical axes of the objectives $e$ $f$ which receive the deflected rays to the optical axis X—X of the middle objective must be increased and be equal to $k+n$, $k$ representing as above the deflection of the rays passing through the prisms and $n$ having a very small value; it results therefrom that the distance from the virtual images $a^3$, $a^4$ of the objectives is necessarily smaller than previously and is equal to $l-n$ and is, consequently, smaller than the distance $m$ from the point $a^1$ to the optical axis X—X of the middle objective.

Consequently, the edge of the utilizable opening of the side objective $e$ does not any longer coincide rigorously with the virtual image $a^3$ and is slightly removed from the same, towards the bottom of the figure, according to the quantity $n$; it is therefore necessary to carry downward, according to this quantity $n$, the edge $a^1$ of the opening of the diaphragm $a$ for causing this opening to coincide with the useful opening of the objective $e$.

In the same way, for causing the opening of the diaphragm to register with the useful opening of the objective $f$, the edge $a^2$ must be carried upward according to the same quantity $n$.

Each of the two diametrically opposed points $a^1$, $a^2$ is then at a distance from the axis X—X equal to $m+n$.

In this case, it will be advantageous to give to the opening of the diaphragm $a$ the shape of an ellipse the large axis of which is equal to $a^1$, $a^2+2n$ and the small axis is equal to $a$ $a^1$.

The luminous efficiency is thus increased in the ratio of the differences of surfaces of this ellipse and of the circle having $a$ $a^1$ as diameter; the utilizable opening of each of the side objectives $e$, $f$ is, it is true, slightly displaced relatively to the utilizable opening of the middle objective $d$, of a quantity $n$, but the latter being very small, the three images obtained are still practically superposable.

For permitting the use of plates unequally sensitive to the three fundamental colors, each of the prisms can be individually displaced relatively to the opening of the diaphragm, so that it covers a greater or less area of the said opening.

The quantity of light which passes through the objectives $e$ $f$ being proportional to this area and the quantity of light received by the middle objective $d$ being proportional to the area of the empty space comprised between the edges $b^1$ and $c^1$ of the prisms $b$ $c$, it will always be possible to find, for a plate having a given sensitiveness, a position of the prisms such that the lighting of each of the images will be reversely proportional to the sensitiveness, of this plate for the corresponding color and such that, consequently, the three images impress the plate with the same rapidity.

For examining the views, use is made of a diaphragm having an opening of a very reduced area, viz: a rectangular slot or, preferably a circular opening the diameter of which, smaller than in the case of taking the views, will have about two millimeters, this circular shape having the advantage of doing away more completely with the phenomenon of diffraction which can occur by the use of a narrow slot.

Figures 2 to 8 illustrate a stereoscopic apparatus for taking views made in accordance with this invention.

As shown in these figures, this apparatus comprises a box $o$ within which are mounted two optical devices similar to that which has just been described.

Figure 3:
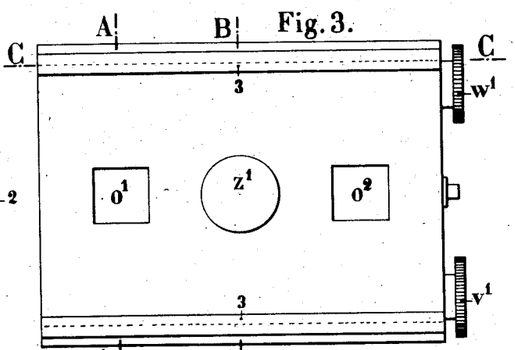
Fig. 3 is a front elevation.
Figure 4:
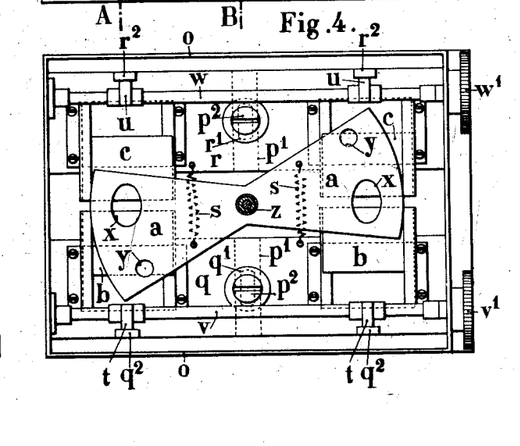
Fig. 4 is a front elevation, the shutter being removed.

On the front wall of this box are provided two openings $o^1$ $o^2$ for the entrance of the luminous rays which are to pass through both optical devices; these openings are closed or uncovered at will by means of a shutter of any suitable type mounted on the inner face of this wall.

Figure 5:
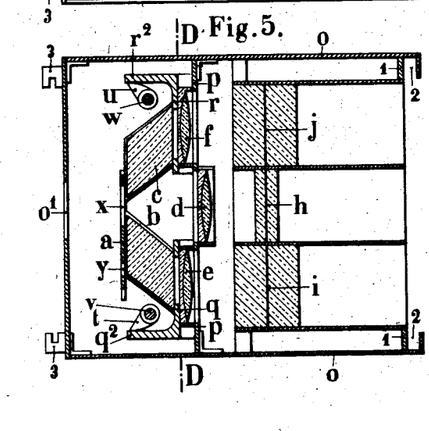
Figs. 5 and 6 are two longitudinal vertical sections taken respectively according on lines A—A and B—B of Fig. 3.
Figure 6:
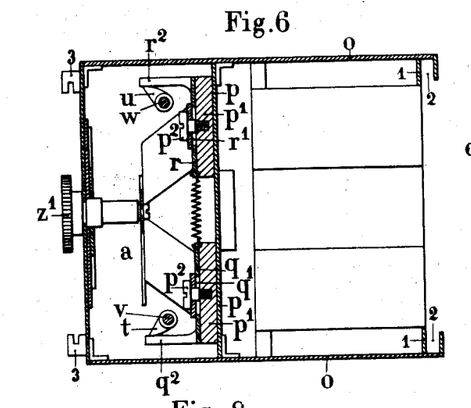
Figure 7:
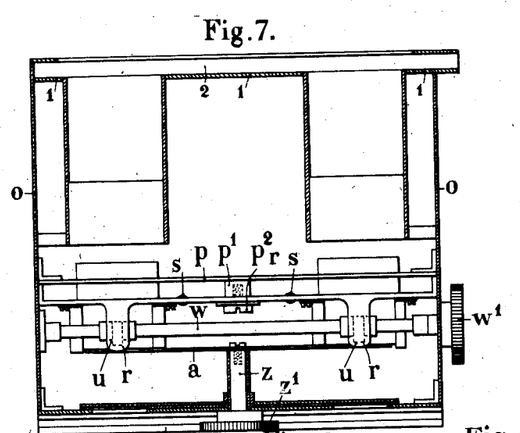
Fig. 7 is a horizontal section taken on line C—C of Fig. 3.

In the box $o$ is placed a partition $p$ provided with mountings arranged in such a manner as to receive two groups of objectives $d$ $e$ $f$; in front of each of these groups of objectives are mounted two prisms $b$ $c$; these objectives and prisms are arranged respectively as previously described; this distance from the prisms to the openings $o^1$ $o^2$ as well as the size of the latter are determined in such a way as to arrest the too oblique rays which would be capable of passing through the prisms without being subjected to total reflection.

Figure 8:
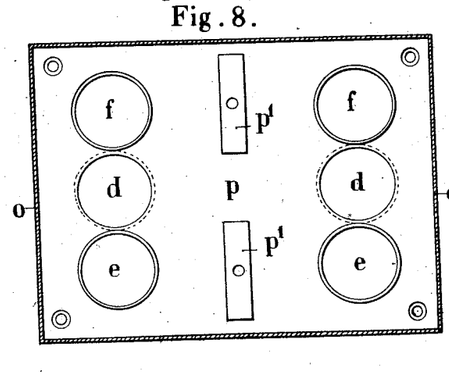
Fig. 8 is a cross section taken on line D—D of Fig. 5.

The mountings of the upper prisms $b$ of both optical systems are secured on one and the same movable plate $q$ and the lower prisms $c$ are secured on one and the same movable plate $r$; these two plates $q$ $r$ can slide on bearings $p^1$ secured by soldering, or other means, to the partition $p$; the guiding of these plates is ensured by a screw $p^2$ screwed in the bearings and engaged in a groove $q^1$ $r^1$ provided in these plates. The two plates $q$ $r$, constantly brought back towards each other by springs $s$, can be moved individually by cams $t$, $u$ acting respectively on heel pieces $q^2$ $r^2$ on the said plates; these cams are rigidly secured on independent driving shafts $v$, $w$ each carrying at one of its ends an operating knot $v^1$, $w^1$.

Against the front face of the two groups of prisms is provided a diaphragm $a$ presenting opposite each optical group an elliptic opening $x$ for taking views and a circular opening, of small diameter $y$, for examining the views. This diaphragm can rock and is rigidly secured on a shaft $z$ carrying an outer operating milled head $z^1$.

As previously explained, the size of the opening of the diaphragm and the spacing apart of the prisms $b$ $c$ are determined in such a manner that a portion of the area of this opening is covered by each of these prisms; by manipulating the knobs $v^1$, $w^1$, it is possible to adjust at will, according to the degree of sensitiveness of the plate, the portion of surface of the upper prisms $b$ or of the lower prisms $c$ uncovered by the opening or pupil of the diaphragm $a$.

For taking views, the diaphragm $a$ is adjusted in such a position that the elliptic openings are presented opposite the prisms $b$ $c$ as illustrated in Fig. 4; and for examining views, the diaphragm is moved so as to present, in front of these prisms, its circular openings $y$.

Behind the objectives, the box $o$ is divided by partitions 1 into two groups of three compartments, in which are mounted the selecting screens $h$, $i$ $j$ each glued between two glass plates, as previously described.

At its rear part, the box $o$ is provided with guides 2 adapted to receive either a plate-holder or a magazine-holder, or in case the apparatus is used for examining views, a positive-holder, in which will be engaged the plate bearing the three positive images.

The box $o$ is, moreover, provided, on its front face, with guides 3, in which will be engaged, in case a positive is examined, a special eye-piece constituted as described hereafter.

Figure 9:
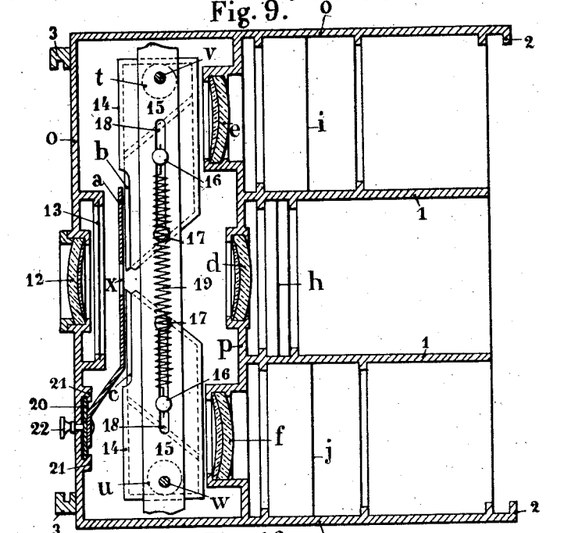
Figs. 9 and 10 illustrate a modified form in longitudinal vertical and cross sections respectively.
Figure 10:
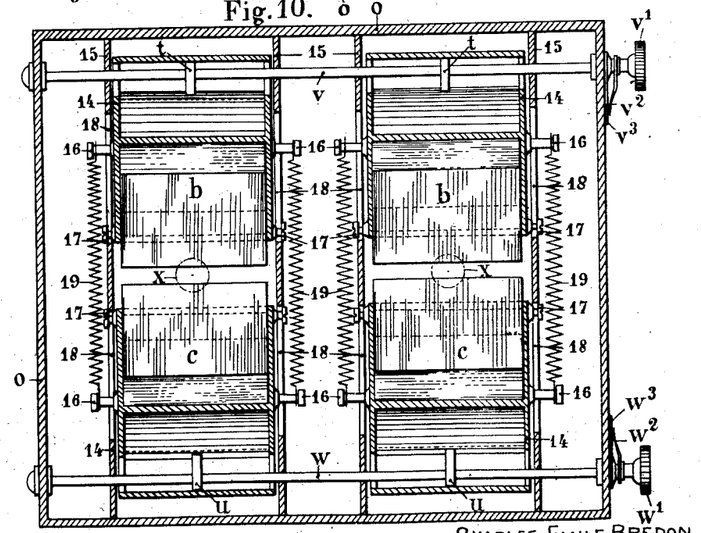

Figs. 9 and 10 illustrate a modified form of this type of apparatus.

In this modified form, the box $o$ carries on its front face a front objective 12 mounted at the place of the openings $o^1$, $o^2$ of the apparatus previously described; this device will be used in case it is considered necessary to correct the distortion which is always given by the ordinary objectives.

Each front objective is masked or uncovered at will by means of a shutter 13 of any suitable type.

The luminous rays entering through this front objective pass as previously stated through a pupil-opening provided in a diaphragm $a$ and are divided in three bundles by two prisms $b$ $c$ capable of being moved individually, parallel to the plane of the diaphragm so as to permit of adjusting the respective intensity of the three bundles.

For that purpose, these prisms are supported by mountings 14 each suitably held between two posts 15 of the body of the apparatus by means of screws 16 and 17 engaged in grooves 18 formed in the said posts and capable of moving in the said grooves, thus ensuring the rectilinear guiding of the prisms.

The displacements of the mountings and of the prisms, which latter are constantly brought back towards each other by a coil spring 19 attached to the screws 16, are obtained by eccentrics $t\ u$ rigidly secured on rods $v\ w$ carried by the body of the apparatus.

These rods $v\ w$ are provided with outer operating milled heads $v^1\ w^1$ and with indexes $v^2\ w^2$ moving on suitably graduated dials $v^3\ w^3$ (Fig 13), so as to permit of exactly determining the position of the prisms $b$ and $c$ and of giving them the position which corresponds to the characteristics of a given plate.

Figure 11:
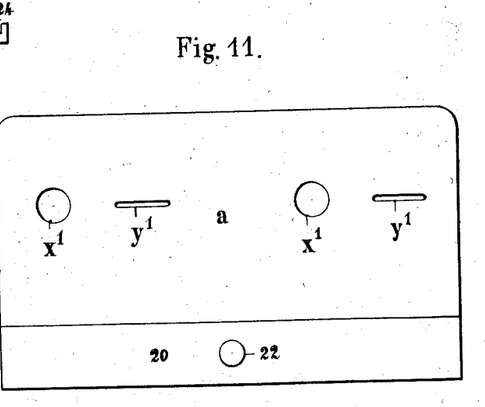
Fig. 11 is a detail view showing in elevation the diaphragm used in this modified form.

The diaphragm may be constituted as shown in Fig. 11 by a plate presenting opposite each optical group a circular opening $x^1$ for taking the views or a slot $y^1$ for examining the views; this diaphragm is mounted on a blade 20 slidable in two guides 21 carried by the front wall of the box $o$; an operating knob 22 secured to the blade 20 permits of imparting a longitudinal movement to the diaphragm $a$ and of optionally bringing opposite each optical group either the circular opening $x^1$ in the case of taking views or the longitudinal slot $y^1$ for examining the views.

For an ordinary apparatus, the diaphragm is provided of course with a single circular opening $x^1$ and a single slot $y^1$.

Figure 12:
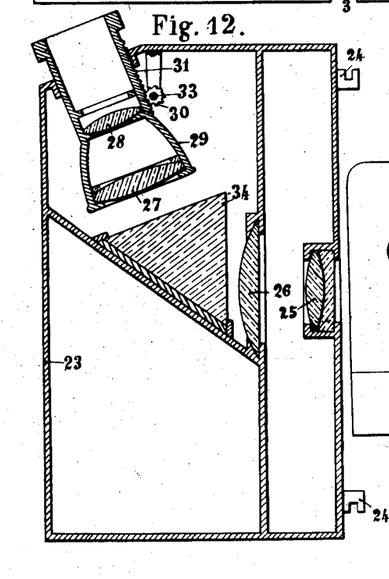
Fig. 12 is a vertical section of the eye-piece device adapted to the apparatus for examining the views.
Figure 13:
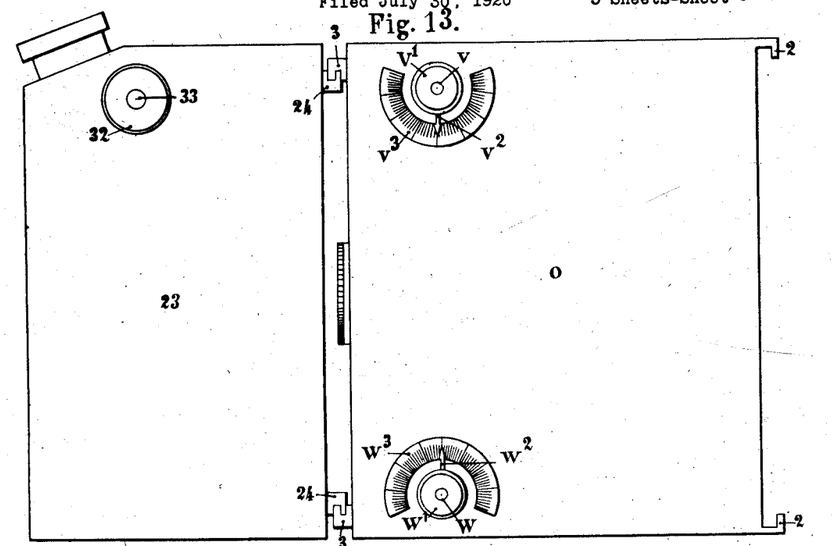
Fig. 13 shows in side elevation the whole of the chromographic apparatus and of the eye-piece device.

The images obtained with one or the other of the above described apparatus are printed on an ordinary diapositive plate; the positive obtained can be put in the place of the panchromatic plate into the apparatus which has given this positive for examining the same. This examination is effected by means of a special eye-piece device, contained in a box 23 provided on its rear face with reglets 24 which fit in the guides 3 of the front wall of the apparatus for taking the views, as shown in Figs. 12 and 13.

This eye-piece device adapted, as above stated, to produce the simultaneous vision of the various images and their optical melting into a single image having the colors of the photographed subject, comprises essentially four lenses 25, 26, 27, 28 combined in such a manner as to form at a small distance behind the last lens an inverted image of the diaphragm, so that the eye can be exactly placed at the spot where this image is produced; the pupil thus receives the totality of the rays which have passed through the objectives $d$, $e\ f$ and has the impression of a single image variously colored. The two last lenses 27, 28 allow the focussing according to the sight; for that purpose they are carried by one and the same mounting 29 so as to be movable, in the well known manner, by means of a pinion 30 gearing with a rack 31 carried by this mounting and actuated by an operating milled head 32 rigidly secured on the axis 33 of this pinion.

The positive plate must be placed in the apparatus so that each of the images it comprises is opposite its own selecting screen; it results therefrom that the gelatine is at the back of the apparatus and that the images are inverted. In these conditions, the eye-piece described would therefore give a straight or upright image but the left-hand of which would be on the right, as if it was seen in a mirror.

For avoiding this inconvenience, the apparatus is turned round and the eye-piece is provided between the two groups of lenses with a prism 34 the reflection of which on its inner face shows the image in its normal position.

This device has the advantage, in the case of binocular vision applied to stereoscopic positives of not necessitating the previous transposition when printing the said positives, transposition which, moreover, would be inconsistent with the perfect registration of the colored images, in view of their optical coincidence.

The positive-plate holder which is introduced in the rear slides of the chromograph may be of any suitable construction, provided it brings and holds the positive in the exact position occupied by the negative when taking the views.

Figures 14, 15:
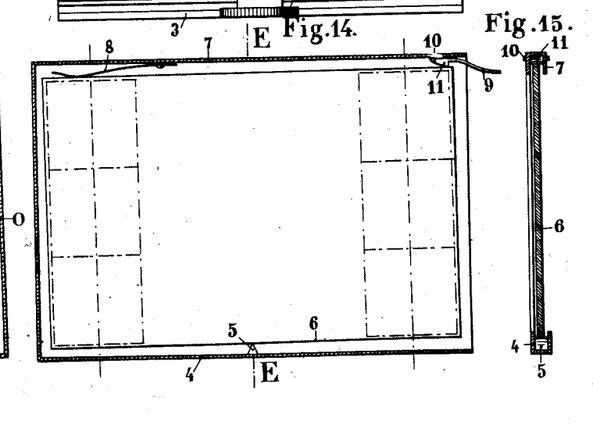
Fig. 14 is an elevation, the frame of the holder being in section.
Fig. 15 is a cross section taken on line E—E of Fig. 14.

In order to allow of obtaining, in a rigorous manner, the optical coicidence of the selected images, the positive-holder may be constructed as illustrated in Figs. 14 and 15.

This holder is provided in the middle of one of its grooves 4 with an abutment 5 on which may rest the edge of the plate 6, this abutment, which constitutes a knife-edge, allows this plate to take slightly different angular positions within the holder. In the opposite grooves 7 are mounted, at one of the ends of the holder, a returning spring 8 pressing on the corresponding edge of the plate, and at the end, a lever 9 movable about an axis 10 and provided with a heel piece 11 acting as a cam.

By lowering the lever 9, the heel piece 11 of the latter presses upon the right-hand end of the upper edge of the plate and thus causes the latter to pivot on the abutment or knife-edge 5; on the contrary, if the lever 9 is raised, the heel piece 11 of the latter ceases to press on the plate, but, under the effect of the pressure exerted by the spring 8 on the left-hand end of the upper edge of the plate, the latter pivots in the reverse direction.

By the angular displacement thus imparted to the plate, either in one direction or in the other, it is possible to establish, in a rigorous manner, the parallelism of the straight line passing through the centres of the three corresponding objectives.

The holder may carry at the rear a ground glass as well as a glass plate having a variable inclination, movable about one of its sides and adapted to increase by reflection the quantity of light received by the positive.

The reproductions obtained with the apparatus forming the subject-matter of this invention are, by reason of the total absence of grain, of a fineness which cannot be obtained by the method generally used with polychromatic plates having a visible grain, particularly in stereoscopy, which is greatly prejudicious to the relief and general appearance of the images.

The colors examined behind the screens which have been used for taking the views, are perfectly exact whatever may be the light used for the examination. In fact, the opening of the diaphragm being always divided in three parts by the edge of the prisms, it is always possible, by suitably moving the latter, to have the relations of intensity which are desired between the blue, green and red rays reaching the eye and to obtain, consequently, an exact reproduction of the colors, whatever may be the source of lighting; this means may also rectify the defects caused by a defective exposure of the plate.

Any panchromatic plates may be used, whatever may be their curve of sensitiveness.

Good results might also be obtained with orthochromatic plates and with ordinary plates, by sufficiently diminishing the green portion and particularly the blue portion of the diaphragm to the benefit of the red portion and by sufficiently increasing the exposure.

Finally, the printing, development and fixing of the plate and of the positive are effected according to the methods generally used in photography, without, however, necessitating any transposition for the printing of stereoscopic positives.

Moreover, these color images are examined as the ordinary sterescopic photographs and as with the latter the number of copies is unlimited.

The modes of execution above described for the realization of a stereoscopic apparatus may also be used for the realization of a simple apparatus comprising a single optical group only; it is to be understood that these modes of execution are given by way of example only and that the form, dimensions and details of construction of the various component elements of the apparatus may be modified.

Claims—

1. In an apparatus for taking photographs in colors by the trichrome process, reflecting faces adapted to divide into several pencils the entering light rays,—objectives so arranged as to be respectively traversed by these light pencils,—a single common diaphragm for the entrance of the light rays, arranged in front of the reflecting surfaces, the opening of the said diaphragm being approximately equal to the utilizable opening of the objectives used.

2. In an apparatus for taking photographs in colors by the trichrome process,—double total reflection prisms adapted to divide into several pencils the entering light rays,—a single common diaphragm for the entrance of the light rays, arranged in front of the prisms, the opening of the said diaphragm being approximately equal to the utilizable opening of the objectives used,—objectives so arranged as to be respectively traversed by the light pencils and so that the interval between the objectives, receiving the deviated pencils and the respective prisms is such that the distance between these objectives and the virtual images of the opening of the diaphragm, produced in the said prisms, is equal to the distance between the middle objective and the said opening.

3. In an apparatus for taking views in colors by the trichrome process, double total reflection prisms adapted to divide into several pencils the entering light rays,—objectives so arranged as to be respectively traversed by these light pencils,—a single diaphragm for the entrance of the light rays, arranged in front of the prisms, the opening of this diaphragm being approximately equal to the utilizable opening of the said objectives,—and means for moving the prisms relatively to each other behind the diaphragm.

4. In an apparatus for taking color photographs by the trichrome process, double total reflection prisms adapted to divide into several pencils the entering light rays,—objectives so arranged as to be respectively traversed by these light pencils,— a single common diaphragm, arranged in front of the reflecting surfaces, the opening of the said diaphragm being approximately equal to the utilizable opening of the objectives and having the shape of an ellipsis the major axis of which is in the plane of the optical axes of the objectives.

5. In an apparatus for taking and examining color photographs by the trichrome process, the combination of three objectives the optical axes of which are parallel; a diaphragm arranged in front of these three objectives and having two openings one of which is used for taking the views and the other, of more reduced area, for examining the views; means for moving this diaphragm and bringing the center of one or the other of the said openings to the axis of the middle objective according to the utilization of the apparatus; two total double reflection prisms interposed between the said diaphragm and the two side objectives, leaving between them a space through which pass the rays which are to pass through the middle objective, the said space being determined in such a manner that each of the prisms covers a portion of the said opening of the diaphragm when brought to the axis of the middle objective; and means for causing the virtual images, formed by the prisms, of the portions of the opening of the diaphragm covered by these prisms, to occupy opposite the side objectives a position exactly similar to that occupied by these portions of the opening of the diaphragm opposite the middle objective.

6. In an apparatus for taking and examining color photographs by the trichrome process, the combination of a central and two outer objectives, the optical axes of which are parallel; a diaphragm arranged in front of these three objectives and having two openings, one of which, for taking the views, having the shape of an ellipse, the small axle of which is sensibly equal to the diameter of the utilizable opening of the objectives employed, and the other, for examining the views, is circular and of more reduced area; means for displacing this diaphragm and bringing the center of one or the other of the said openings to the axis of the central objective according to the utilization of the apparatus; two total double reflection prisms interposed between the said diaphragm and the two outer objectives, leaving between them a gap through which pass the rays which are to pass through the central objective, the said gap being determined in such manner that each of the prisms covers a portion of the opening of the diaphragm brought on the axis of the central objective; and means for causing the virtual images, formed by the prisms, of the portions of the opening of the diaphragm covered by these prisms, to occupy opposite the lateral objectives a position exactly similar to that occupied by these portions of the opening of the diaphragm opposite the central objective.

7. In an apparatus for taking and examining color photographs by the trichrome process, the combination of three objectives the optical axes of which are parallel, a diaphragm arranged in front of these three objectives and presenting opposite the middle objective, a single opening the size of which and the distance separating it from this middle objective being determined, in the normal manner, so that the image formed by the said objective, be free of aberrations; two total double reflection prisms interposed between this diaphragm and the two side objectives and arranged on opposite sides of the axis of the diaphragm opening, so as to leave between them a gap through which pass the rays which are to pass through the middle objective and to each cover a portion of this diaphragm opening, so that a part of the rays entering through the said opening is sent back by their double reflection in each of the prisms through the two side objectives; means for causing the virtual images, formed by the prisms, of the portions of the opening of the diaphragm covered by these prisms, to occupy opposite the lateral objectives a position exactly similar to that occupied by these portions of the diaphragm opposite the middle objective; and a front auxiliary objective mounted in front of the opening of the diaphragm and the optical axis of which coincides with that of the middle objective, and being so constituted as to correct the distortion which the objectives may give.

8. A stereoscopic apparatus for taking and examining color photographs by the trichrome process comprising two optical groups each composed of two total reflection prisms having a gap between them, three objectives arranged respectively opposite the said gap and opposite the two prisms, three selecting screens mounted at the rear of these objectives; the optical axes of the objectives of these two optical groups being in two parallel planes,—a diaphragm mounted against the front faces of the prisms of both optical groups and presenting, opposite each optical group, an opening for taking views, the area of which is sensibly equal to the utilizable opening of the objectives used and an opening of smaller area for examining the views,—means for moving this diaphragm and bringing the center of either of these openings into position to be partly covered by adjacent prisms and to lie in the optical axis of the middle objective of each optical group, according as the apparatus is used for taking views or examining the same.

9. A stereoscopic apparatus for taking and examining color photographs, by the trichrome process, comprising two optical groups each composed of two total double reflection prisms having a gap between them, three objectives arranged respectively opposite the said gap and opposite the two prisms, three selecting screens mounted at the rear of these objectives; the optical axes of the objectives of these two optical groups being in two parallel planes,—a diaphragm mounted against the front faces of the prisms of both optical groups and presenting, opposite each optical group, an opening for taking views, the area of which is sensibly equal to the utilizable opening of the objectives used and an opening of smaller area for examining the views,— means for moving this diaphragm and bringing the center of either of these openings into position to be partly covered by adjacent prisms and to lie in the optical axis of the middle objective of each optical group according as the apparatus is used for taking views or examining the same,—means for moving, in each optical group individually, the prisms relatively to the pupil-openings of the diaphragm, so as to cover or uncover the openings to a greater or less extent, and means for presenting the photographic plate at the rear of said selecting screens.

10. A stereoscopic apparatus for taking and examining color photographs by the trichrome process, comprising two optical groups each composed of two total double reflection prisms having a gap between them, three objectives arranged respectively opposite the said gap and opposite the two prisms, three selecting screens mounted at the rear of these objectives; the optical axes of the objectives of these two optical groups being in two parallel planes,—a diaphragm mounted against the front faces of the prisms of both optical groups and presenting, opposite each optical group, an opening for taking views, the area of which is sensibly equal to the utilizable opening of the objectives used and an opening of smaller area for examining the views,—means for moving this diaphragm and bringing the center of either of these openings into position to be partly covered by adjacent prisms and to lie in the optical axis of the middle objective of each optical group according as the apparatus is used for taking views or examining the same,—two driving shafts,—two cams fast on each shaft and so arranged as to each impart a movement of translation to the mounting of one of the prisms of each optical group, so that the prisms may be caused to cover or uncover the diaphragm opening to a greater or less extent,—returning springs drawing towards each other the mountings of the two prisms of each optical group,—means for guiding the mountings of the prisms in their movement of translation,—means for presenting the photographic plate at the rear of these selecting screens.

11. An eye-piece device adapted to fit opposite the opening of the diaphragm of the chromographic apparatus claimed in claim 1 above and comprising an arrangement of lenses combined so as to produce an inverted image of the opening of the diaphragm of the chromographic apparatus at a spot where the eye can receive such image.

12. An eye-piece-device adapted to fit opposite the opening of the diaphragm of the apparatus claimed in claim 1, comprising a casing, four lenses mounted in the casing so as to give at the rear of the lens adjacent to the eye of the observer an inverted image of the opening of the diaphragm,—means for mounting the device in position with its lenses in line with the diaphragm opening,—means for moving the two front lenses relatively to the two others for focusing,—a total reflection prism interposed between the two front lenses and the two others.

13. An eye-piece-device for stereoscopic apparatus as claimed in claim 8, comprising a casing, four lenses mounted in the casing opposite each optical group of the said stereoscopic apparatus, so as to give at the rear of the lens adjacent to the eye of the observer an upright image of the opening of the diaphragm; a total reflection prism mounted in the casing and interposed between these lenses; means for moving the two first front lenses for focusing,—and means for mounting this eye-piece-device on the stereoscopic apparatus.

The foregoing specification of my "apparatus for taking and examining color photographs" signed by me this 30th day of June 1920.

CHARLES EMILE BREDON.